United States Patent
Wang et al.

(10) Patent No.: US 6,369,535 B1
(45) Date of Patent: Apr. 9, 2002

(54) METHOD AND APPARATUS FOR CURRENT SHAPING IN ELECTRONICALLY COMMUTATED MOTORS

(75) Inventors: Jing Wang, Schenectady; Robert Louis Steigerwald, Burnt Hills, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,169

(22) Filed: Jul. 31, 2001

(51) Int. Cl.$^7$ ............................................... H02K 23/00
(52) U.S. Cl. ........................ 318/254; 318/138; 318/439; 318/801; 318/812
(58) Field of Search ............................... 318/254, 434, 318/138, 801, 812

(56) References Cited

U.S. PATENT DOCUMENTS 5,448,149 A * 9/1995 Ehsani et al. ................ 318/254

OTHER PUBLICATIONS

D. Jouve, Et Al. "Torque Ripple Compensation In DSP Based Brushless Servo Drive", Intellingent Motion, Jun. 1993 Proceedings, pp. 28–37.

* cited by examiner

Primary Examiner—Karen Masih
(74) Attorney, Agent, or Firm—George C. Goodman; Donald S. Ingraham (57) ABSTRACT

A method and apparatus are disclosed for shaping current in an electronically commutated motor (ECM), the method comprising: acquiring a set of terminal voltage measurements; estimating an instantaneous rotor angle from the terminal voltage measurements; generating a set of phase current commands from the instantaneous rotor angle and from a torque reference signal, each of the phase current commands comprising at least one ripple compensation command segment and at least one zero current command segment; and converting the set of phase current commands to a set of current reference signals.

15 Claims, 13 Drawing Sheets

METHOD AND APPARATUS FOR CURRENT SHAPING IN ELECTRONICALLY COMMUTATED MOTORS

BACKGROUND OF INVENTION

This invention relates generally to the field of electric motors and particularly to the field of controlling electronically commutated motors.

With the advent of reliable, low cost power electronics, an application that once used a brush-type, DC (direct current) motor, is now likely to employ a smaller, safer, cleaner running, longer-lived, and less expensive electronically commutated motor (henceforth, ECM).

The ECM is a permanent magnet electrical machine with the magnet (or magnets) on the rotor and multiple, spatially distributed phase windings on the stator. Current in the windings interacts with the permanent magnetic field to produce the machine's torque. To maintain a constant torque as the rotor turns, the current distribution in the stator is continually adjusted to maintain a constant spatial relationship with the rotor's magnetic field. The adjustment in current distribution is accomplished by switching ("commutating") current among the various stator winding phases. In a brush-type DC motor, where the magnets are stationary and the windings rotate, commutation occurs mechanically through the interaction of brushes with a commutator ring. In an ECM, as the name implies, commutation is effected electronically by controlling the conduction states of a multiplicity of electronic power devices electrically coupling the various stator phase windings to a power bus. A subsystem comprising the power devices and any apparatus required to realize a set of power device conduction states appropriate to a respective set of device control signals is called a "power amplifier"; a subsystem comprising any apparatus used to generate the set of device control signals so as to cause the ECM phase currents to track a set of current reference signals is called a "current controller"; a subsystem comprising any apparatus used to generate the set of current reference signals so as to cause the motor torque to track a torque reference signal is called a "torque controller"; a subsystem comprising a power amplifier, a current controller and a torque controller is called a "motor drive".

ECMs are generally divided into two broad classes, distinguished by the way the stator windings are spatially distributed, and named according to the shape of the back EMF (electromotive force) waveforms generated. A motor with a concentrated winding generates a trapezoidally shaped back EMF waveform and is referred to as a "trapezoidal ECM" a motor with a sinusoidally distributed winding is a "sinusoidal ECM." Conventionally, motor drives used with either class of motor generate phase current waveforms that have a similar shape to and are aligned/with the back EMF waveforms of the respective phases. This current shaping strategy constrains the torque to remain unidirectional. While both motor classes may use the same power amplifier and current controller designs, torque controller designs generally differ between the two.

Sinusoidal ECM systems generally employ an explicit rotor angle sensor such as, for example, an optical shaft encoder or a resolver. The torque controller acquires the rotor angle sensor output and generates current reference signals that are sinusoidal functions of the measured angle.

In contrast, trapezoidal ECM systems often employ an implicit rotor angle sensing technique. Because the phase current is intermittently conducted, trapezoidal systems can achieve an angle measurement by sensing the back EMF at the terminals of non-conducting phases and generating a signal whenever a prescribed voltage threshold is crossed. These threshold crossing signals initiate step changes in the current reference signals for the appropriate phases.

In general, compared to a sinusoidal ECM system, a comparably sized trapezoidal system has the advantage of being less expensive owing to the absence of an explicit angle sensor, the relative simplicity of the torque control algorithm, and the relatively simple construction of the concentrated winding motor. A trapezoidal ECM system has the disadvantage, however, of producing significantly higher levels of undesirable torque ripple.

Those applications where cost is the primary concern and torque ripple is a secondary consideration have been traditionally well served by trapezoidal systems. In contrast, those applications requiring lower torque ripple have been traditionally satisfied by more expensive solutions using sinusoidal ECMs. Applications where the torque ripple of a conventional trapezoidal ECM system would be unacceptable, yet the cost of a conventional sinusoidal ECM system would be prohibitive are not well served by either solution. One such application, for example, would be a variable speed blower for high efficiency heating, ventilation, and air conditioning in commercial and domestic buildings. An opportunity exists, therefore, to address these orphan, low ripple, low cost applications.

SUMMARY OF THE INVENTION

By combining conventional trapezoidal motor, power amplifier, and current controller designs with a novel torque controller design, embodiments of the present invention provide a system with a torque ripple performance approaching that of a sinusoidal system at a cost approaching that of a trapezoidal system.

A method and apparatus are disclosed for shaping current in an electronically commutated motor (ECM), the method comprising: acquiring a set of terminal voltage measurements; estimating an instantaneous rotor angle from the terminal voltage measurements; generating a set of phase current commands from the instantaneous rotor angle and from a torque reference signal, each of the phase current commands comprising at least one ripple compensation command segment and at least one zero current command segment; and converting the set of phase current commands to a set of current reference signals.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
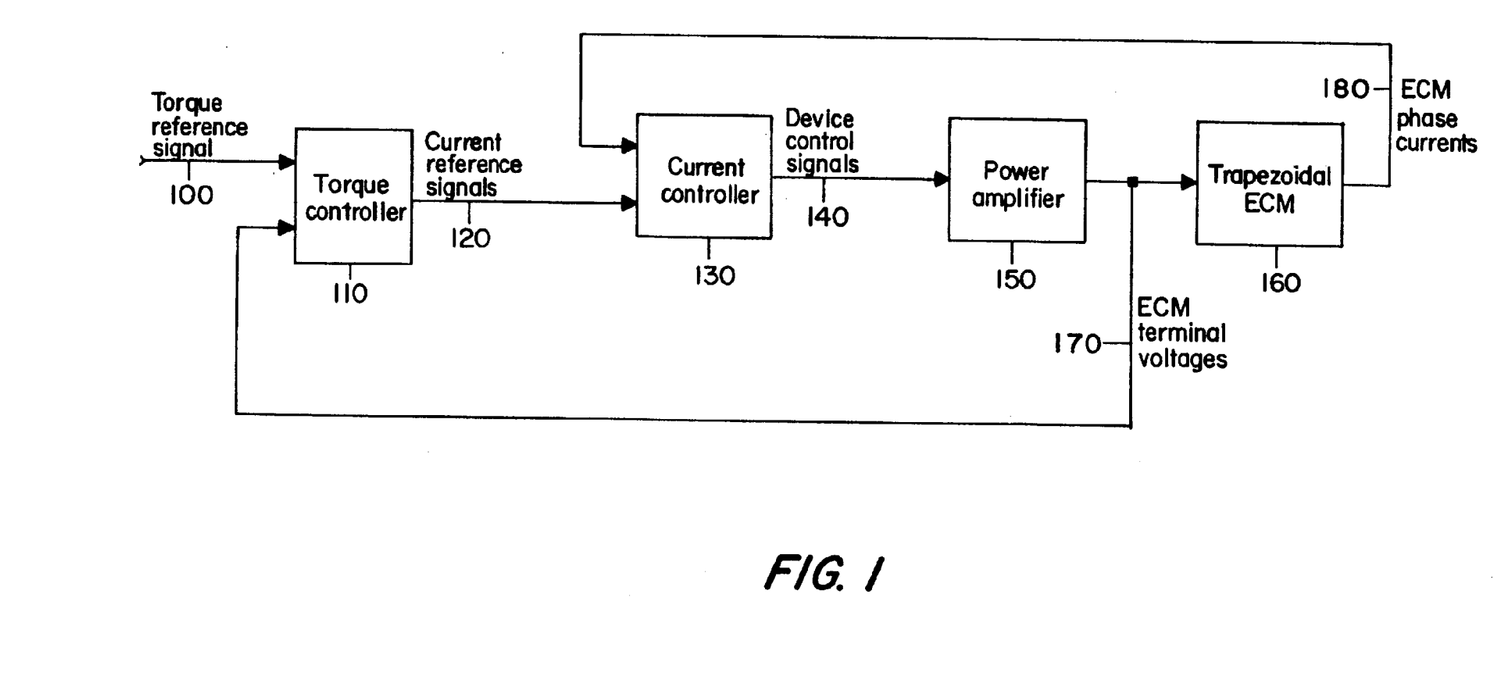
FIG. 1 is a block diagram illustrating a trapezoidal ECM coupled to a motor drive in accordance with one embodiment of the present invention.
Figure 13:
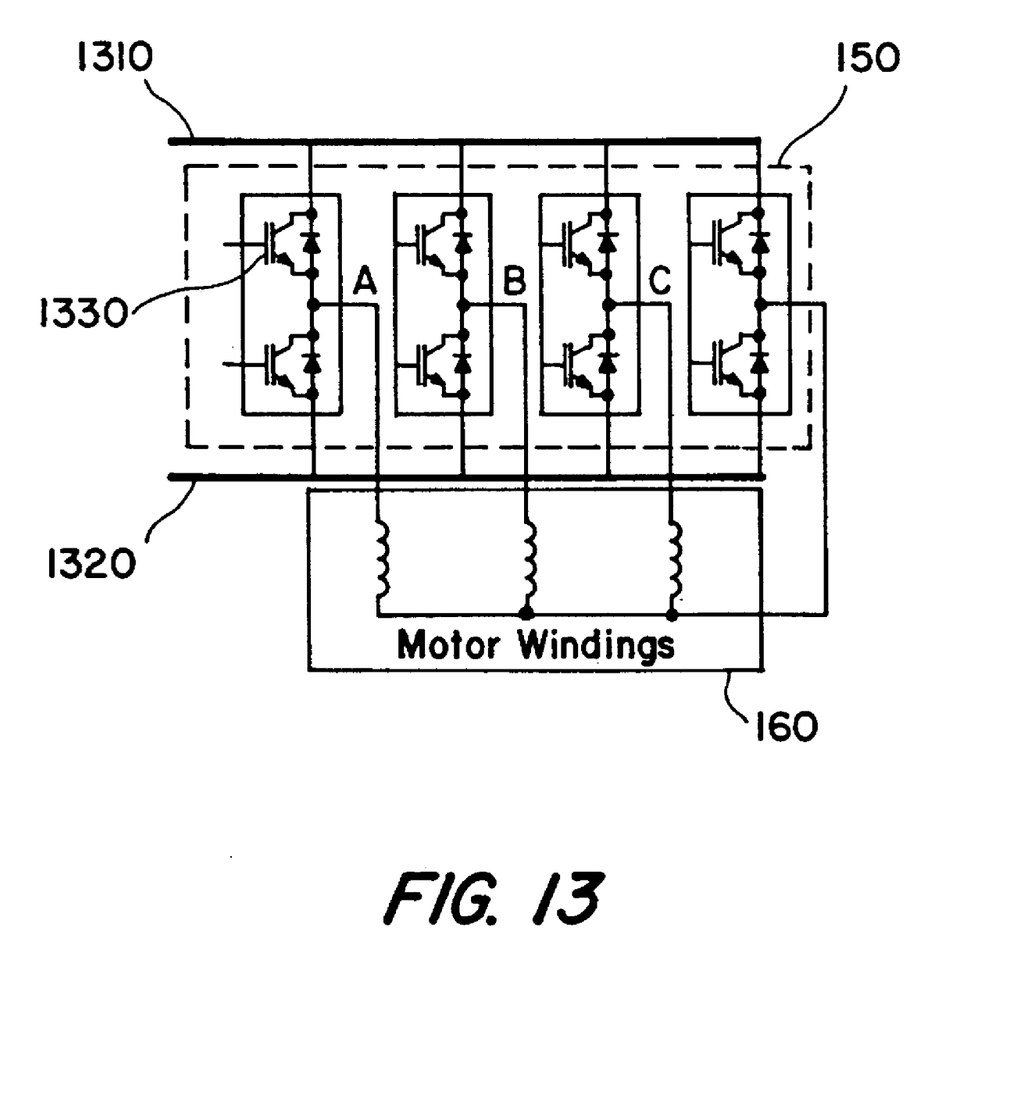
FIG. 13 is a schematic diagram illustrating a conventional, four-leg power amplifier.

FIG. 1 is a block diagram illustrating a trapezoidal ECM 160 connected to a motor drive in accordance with one embodiment of the present invention wherein the motor drive comprises a torque controller 110, a current controller 130, and a power amplifier 150. As discussed above, trapezoidal ECM 160 has a plurality of stator phase windings. The ends of the stator windings are electrically coupled to terminals on the body of trapezoidal ECM 160 with pairs of such terminals defining motor phases. As FIG. 13 illustrates, power amplifier 150 comprises a collection of electronic power devices 1330 coupling the various motor phases to a power supply bus 1310 and to a power return bus 1320. In the embodiment of FIG. 13, four phase legs are shown, allowing independent control of all three motor phase currents. In response to a set of device control signals 140 (FIG. 1), electrical power is conducted to the appropriate motor phase or phases; power amplifier 150 thus further comprises any electronics required to receive such device control signals 140 and realize the appropriate power device conduction states.

Device control signals 140 are generated by current controller 130 whose function is to cause each of ECM phase currents 180 to track a respective one of a set of current reference signals 120, there being a one-to-one correspondence between the set of current reference signals 120 and the set of ECM phase currents 180. Typically, as shown, current controller 130 uses feedback from ECM phase currents 180 to accomplish its task.

Current reference signals 120 are generated by torque controller 110. Torque controller 110 receives a torque reference signal 100 which serves as a request for a desired level of total torque in trapezoidal ECM 160; torque controller 110 also has access to ECM terminal voltages 170. The task of torque controller 110 is to determine how the desired total torque is to be distributed among the various motor phases and to generate a set of current reference signals 120, one signal for each motor phase, so that each phase realizes an appropriate phase torque. The phase torques sum to produce total motor torque.

By way of example, but not limitation, an ideal three-phase trapezoidal ECM is considered (FIG. 7) with the phases labeled A, B, and C. Each cycle of a phase A back EMF waveform 701 for trapezoidal ECM 160 comprises: a first ramp EMF segment 700; followed by a first constant EMF segment 710; followed by a second ramp EMF segment 720; followed by a second constant EMF segment 730; followed by a third ramp EMF segment 740 ; followed by a third constant EMF segment 730; followed by a fourth ramp EMF segment 760; followed by a fourth constant EMF segment 770. The back EMF waveforms for the remaining phases have the same shape as phase A back EMF waveform 701, with phase B back EMF waveform 702 lagging phase A back EMF waveform 701 by 120 degrees, and phase C back EMF waveform 703 lagging phase B back EMF waveform 702 by 120 degrees. The trapezoidal shape of the non-zero segments of the back EMF waveform gives trapezoidal ECM 160 its name.

Figure 7:
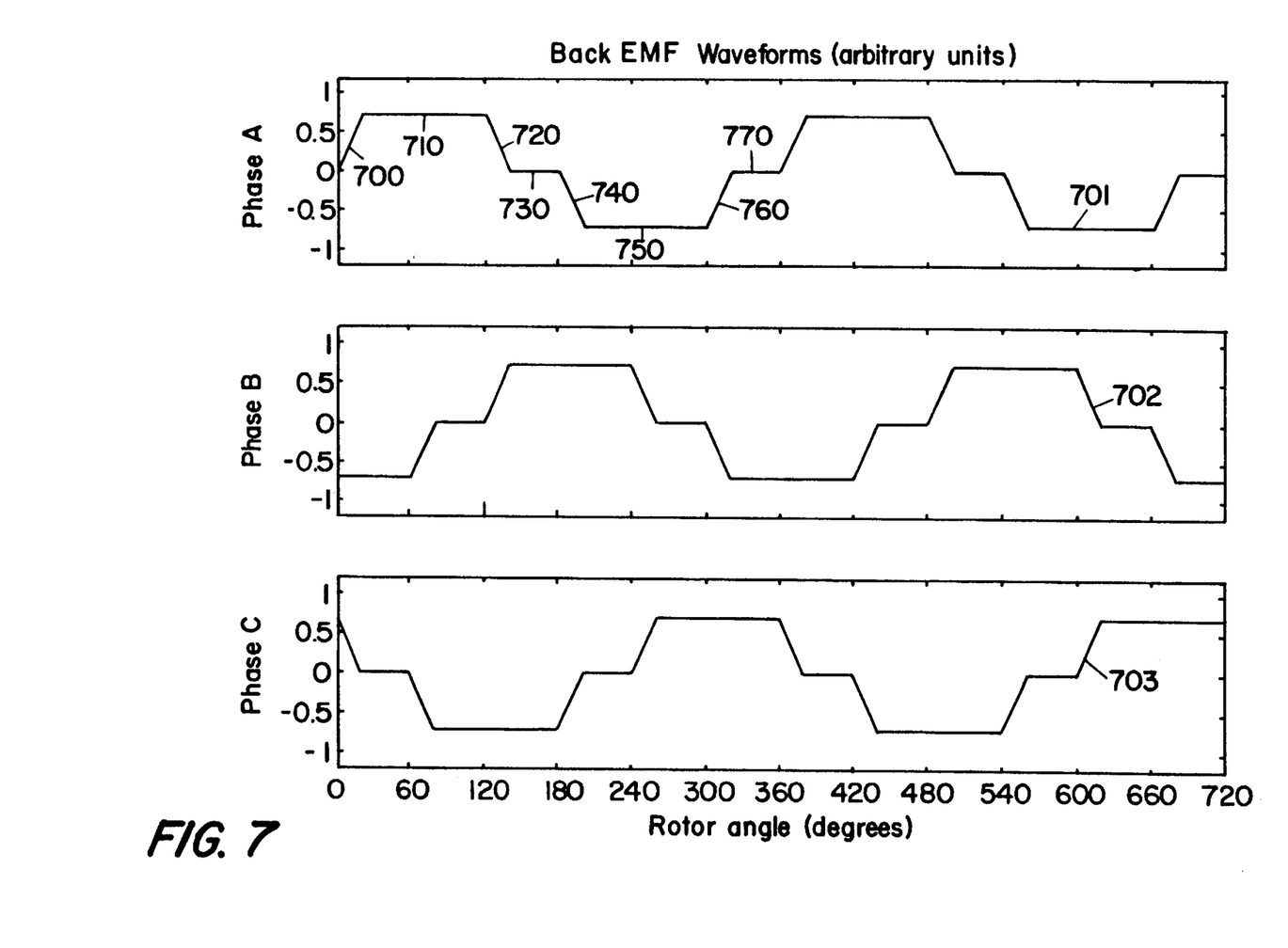
FIG. 7 is a set of graphs illustrating back EMF waveforms as a function of rotor angle for each phase of an ideal three-phase trapezoidal ECM.
Figure 8:
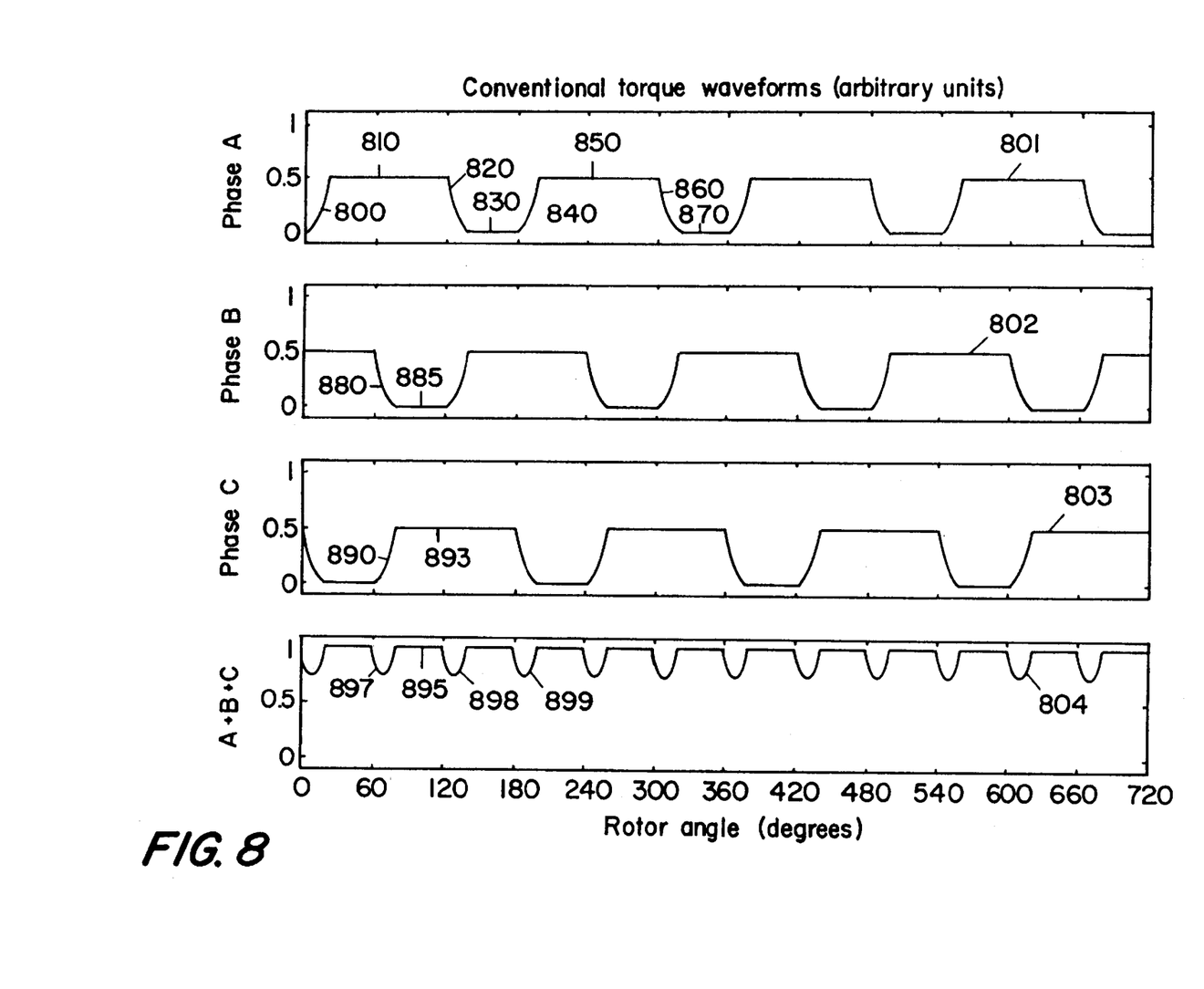
FIG. 8 is a set of graphs illustrating conventional torque waveforms for individual phase torques and total torque as functions of rotor angle for an ideal three-phase trapezoidal ECM.
Figure 11:
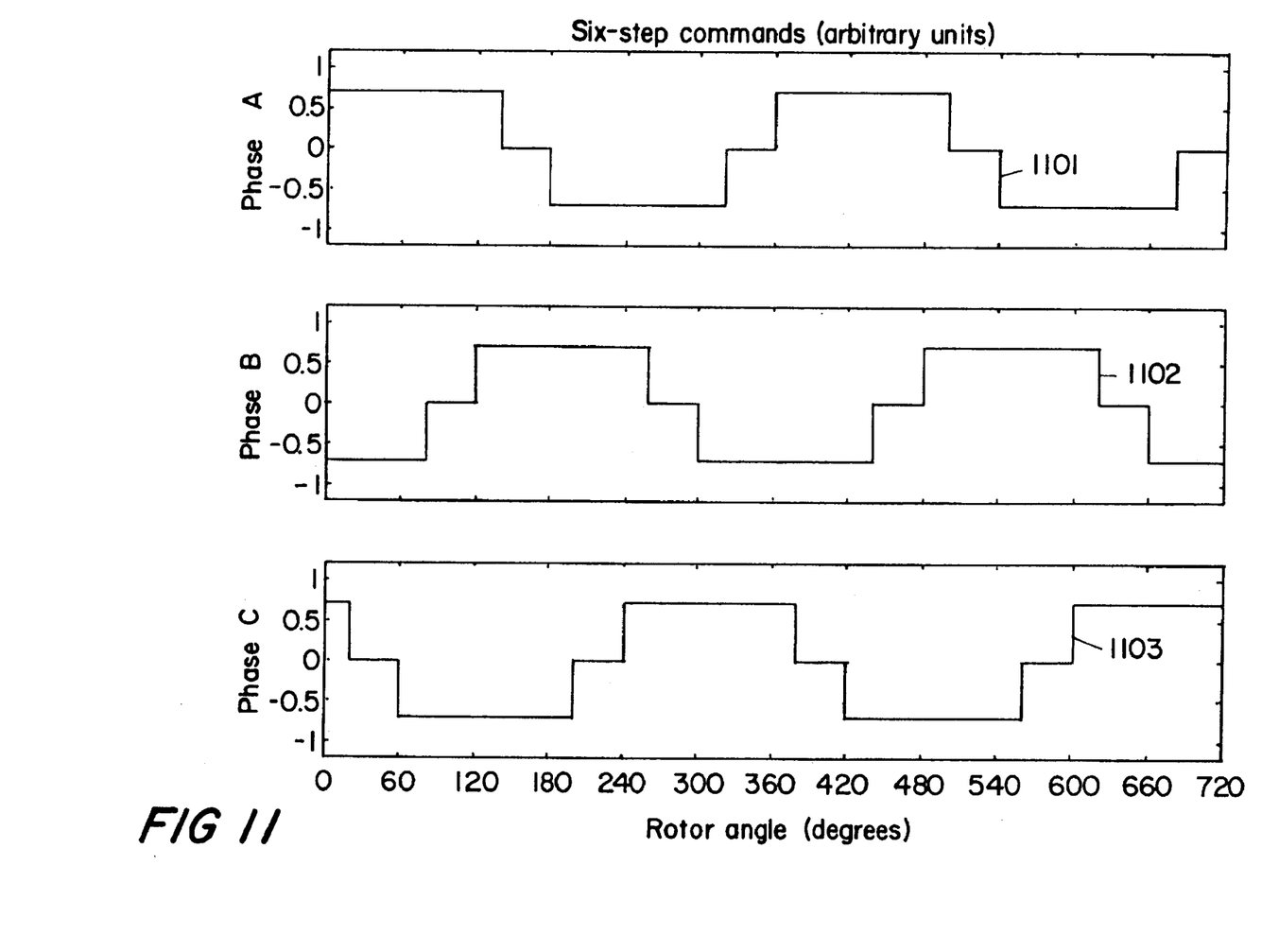
FIG. 11 is a set of graphs illustrating a set of six-step commands which, when applied to a current controller, produce phase current waveforms with approximately the same shape as the back EMF waveforms depicted in FIG. 7.

A conventional approach to the design of a torque controller 110 (FIG. 1) for a three-phase trapezoidal ECM 160 generates current reference signals 120 in the form of six-step commands 1101, 1102, 1103 (FIG. 11), so called because among the three phases there are six non-zero current reference signal steps per rotor cycle. Because the phase windings have a non-zero inductance and because there is only finite voltage available to drive the phase currents, when applied to the current controller these six-step commands 1101, 1102, 1103 produce phase current waveforms with trapezoidal shapes similar to the back EMF waveforms 701, 702, 703 (FIG. 7) of the respective phases. For simplicity of presentation, it is herein assumed those current waveforms are identical to the back EMF waveforms 701, 702, 703. Since the phase torques obey the equations:

$$T_A = E_A i_A / \omega$$

$$T_B = E_B i_B / \omega,$$

$$T_C = E_C i_C / \omega$$

where $T_A, T_B, T_C$ are the phase torques in newton-meters, $E_A, E_B, E_C$ are the line-to-neutral phase back EMFs in volts $i_A, i_B, i_C$ are the phase currents in amperes, and $\omega$ is the rotor angular speed in radians per second, this conventional approach produces conventional phase torque waveforms 801, 802, 803 (FIG. 8) that are proportional to the squares of the respective back EMF waveforms 701, 702, 703. Conventional phase torque waveforms 801, 802, 803 are, therefore, piecewise constant, corresponding to the constant segments of the back EMF, and piecewise parabolic, corresponding to the ramp segments. Thus, first parabolic torque segment 800 corresponds to first ramp EMF segment 700, first constant torque segment 810 corresponds to first constant EMF segment 810, and so forth with torque segments 820, 830, 840, 850, 860, and 870 corresponding to EMF segments 720, 730, 740, 750, 760, and 770, respectively.

Over a range of rotor angles where the phase torque segments for the three phases are all constant, the respective portion of the total motor torque waveform 804 is also constant. For example, a phase A constant torque segment 810, a phase B constant torque segment 885, and a phase C constant torque segment 893 sum to produce a total motor torque constant segment 895. When two of the phase torque segments are parabolic, a torque ripple segment is present in total motor torque waveform 804. For example, phase A constant torque segment 810, a phase B parabolic torque segment 880, and a phase C parabolic torque segment 890 sum to produce a first total motor torque ripple segment 897. All of the torque ripple segments in total motor torque waveform 804 are formed in a similar fashion: two commutating segments contribute parabolic phase torque segments while a non-commutating segment contributes a constant phase torque segment. As used herein, a segment is said to be "commutating" if it includes at least one zero value and at least one non-zero value; a segment is said to be "non-commutating" if it is not commutating.

It is possible to reduce the ripple in total motor torque waveform 804 induced by the commutating segments by modifying the non-commutating segments of the phase current waveforms. By way of example, but not limitation, subtracting first total motor torque ripple segment 897 from a constant torque equal to the torque of total motor torque constant segment 895, dividing the resulting difference by a constant EMF equal to the EMF of first constant EMF segment 710 (FIG. 7), then adding the resulting quotient to the conventional current corresponding to first constant EMF segment 710 yields a phase A modified current waveform 901 (FIG. 9) with a phase A ripple compensation current segment 997. This phase A modified current waveform 901 produces a phase A modified phase torque waveform 1001 (FIG. 10) including a phase A ripple compensation torque segment 1097 which, when added to phase B parabolic torque segment 880 and to phase C parabolic torque segment 890, produces a constant segment of a modified total motor torque waveform 1004.

Figure 9:
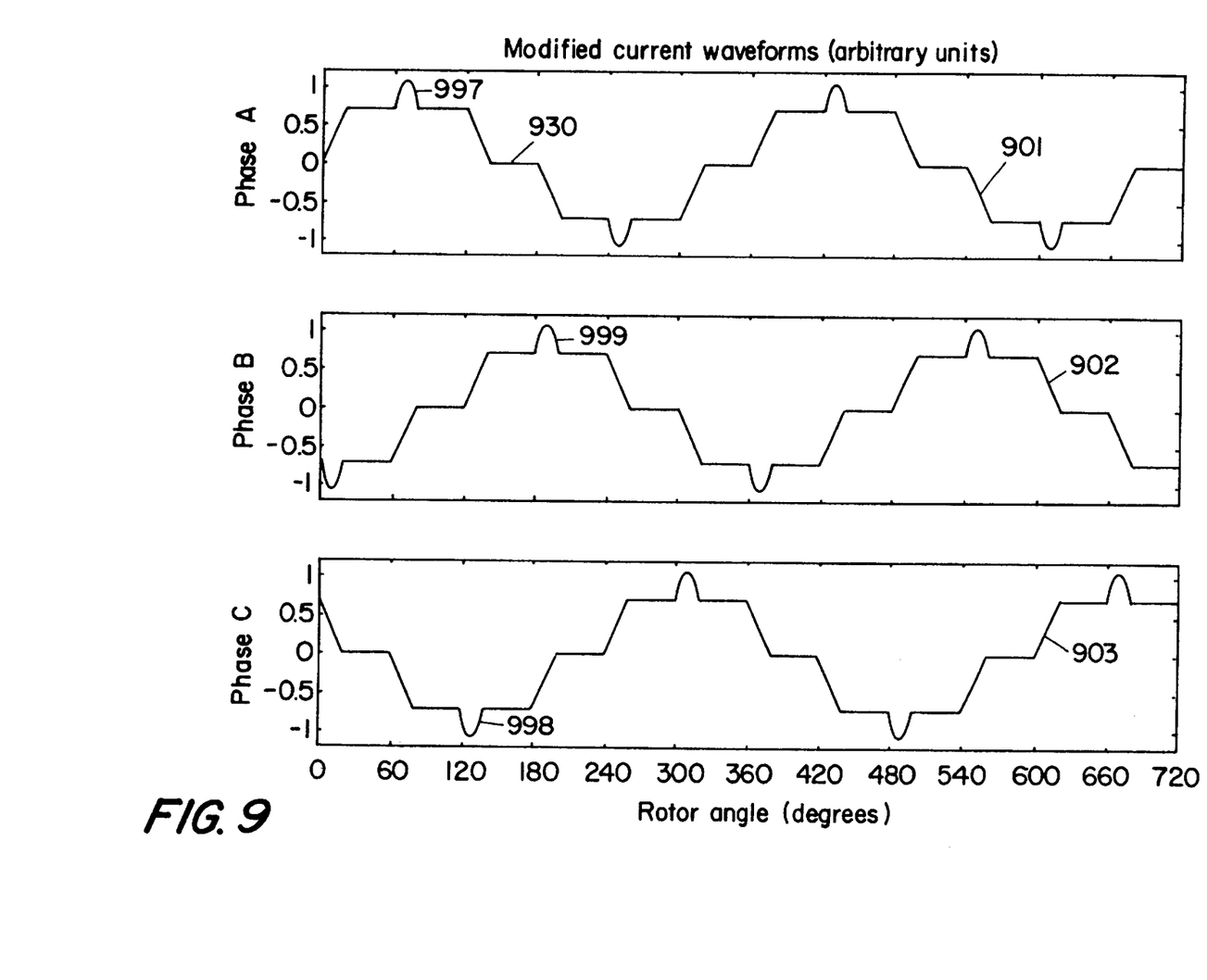
FIG. 9 is a set of graphs illustrating a set of modified current waveforms for a three-phase trapezoidal ECM in accordance with an embodiment of the present invention.
Figure 10:
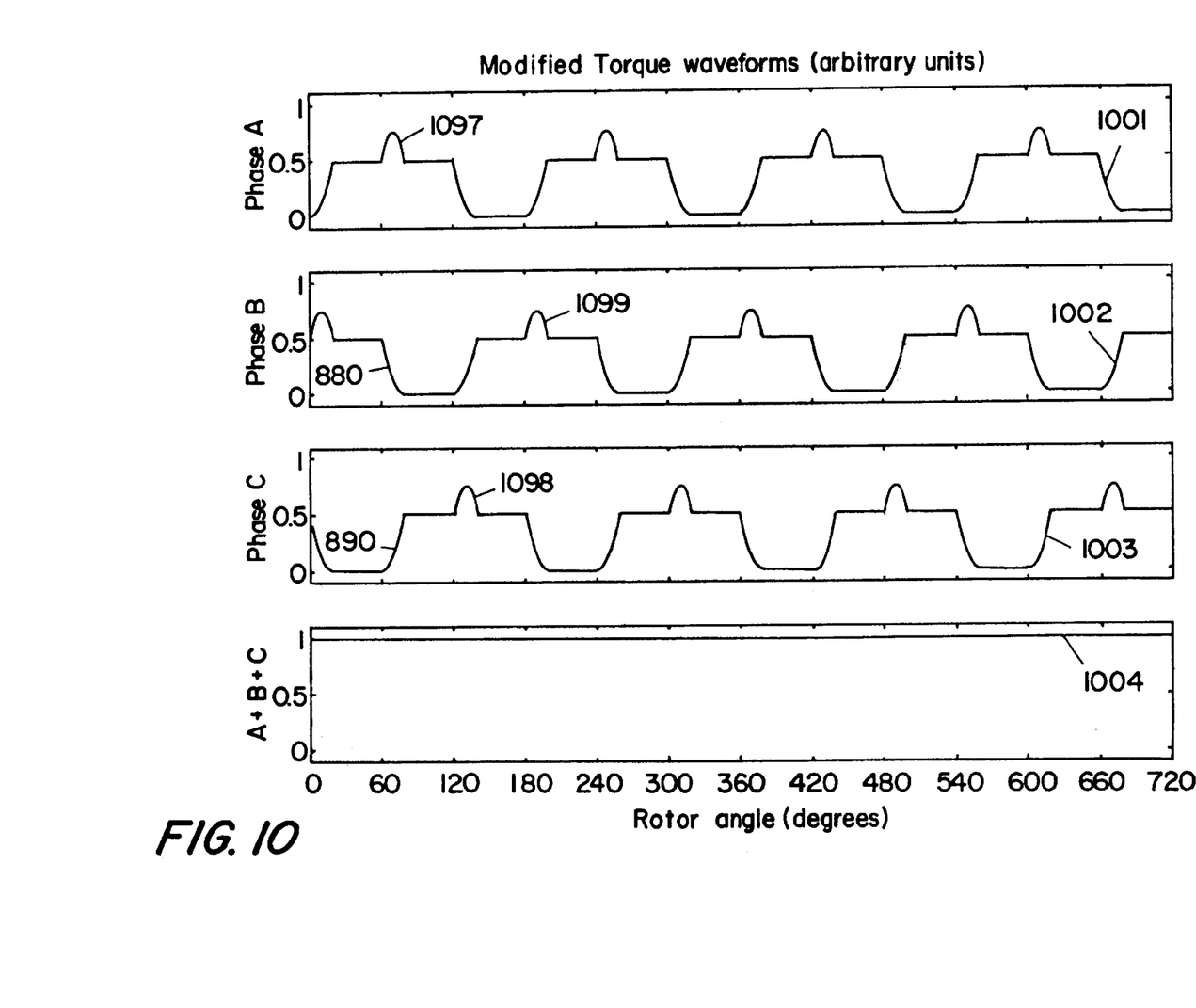
FIG. 10 is a set of graphs illustrating a set of modified torque waveforms for the individual phase torques and the total torque as functions of rotor angle in accordance with an embodiment of the present invention.

Similar procedures starting with a second total motor torque ripple segment 898 and a third total motor torque ripple segment 899 yield a phase C ripple compensation current segment 998 and a phase B ripple compensation current segment 999, respectively, which produce a phase C ripple compensation torque segment 1098 and a phase B ripple compensation torque segment 1099, respectively. Applying this procedure to the remainder of the phase current waveforms produces a set of modified phase current waveforms 901, 902, 903 which yields a set of modified torque waveforms 1001, 1002, 1003 which sum to produce modified total motor torque waveform 1004. Compared to conventional total motor torque waveform 804, modified total motor torque waveform 1004 shows a reduction in torque ripple.

Each of the modified phase current waveforms 901, 902, 903 (FIG. 9) has two salient features: first, each comprises at least one ripple compensation current segment (for example, phase A ripple compensation current segment 997); second, each comprises at least one zero current segment (for example, a phase A zero current segment 930). As defined herein, a "ripple compensation current segment" is any portion of a phase current waveform whose purpose is to reduce the total motor torque ripple induced by the other phases; a "zero current segment" is any portion of a phase current waveform wherein the current is zero amperes for at least about 10 microseconds. The purpose of the zero current segments is to allow a back EMF sensing technique to be used for estimating the rotor angle without the use of an explicit rotor angle sensor.

An idealized set of current reference signals 120 (FIG. 1) for producing such a set of modified phase current waveforms 901, 902, 903 (FIG. 9) when applied to a current controller 130 is derived from a set of exemplary phase current commands 1201, 1202, 1203 (FIG. 12), each of which comprises: at least one ripple compensation command segment intended to produce at least one ripple compensation current segment; and at least one zero current command segment intended to produce at least one zero current segment. For example, phase A exemplary phase current command 1201 comprises: a phase A ripple compensation command segment 1297, intended to produce phase A ripple compensation current segment 997, and a phase A zero current command segment 1230, intended to produce phase A zero current segment 930. As defined herein, a "ripple compensation command segment" is any portion of a phase current command waveform whose purpose is to produce a ripple compensation current segment; a "zero current command segment" is any portion of a phase current command waveform whose purpose is to produce a zero current segment.

Figure 2:
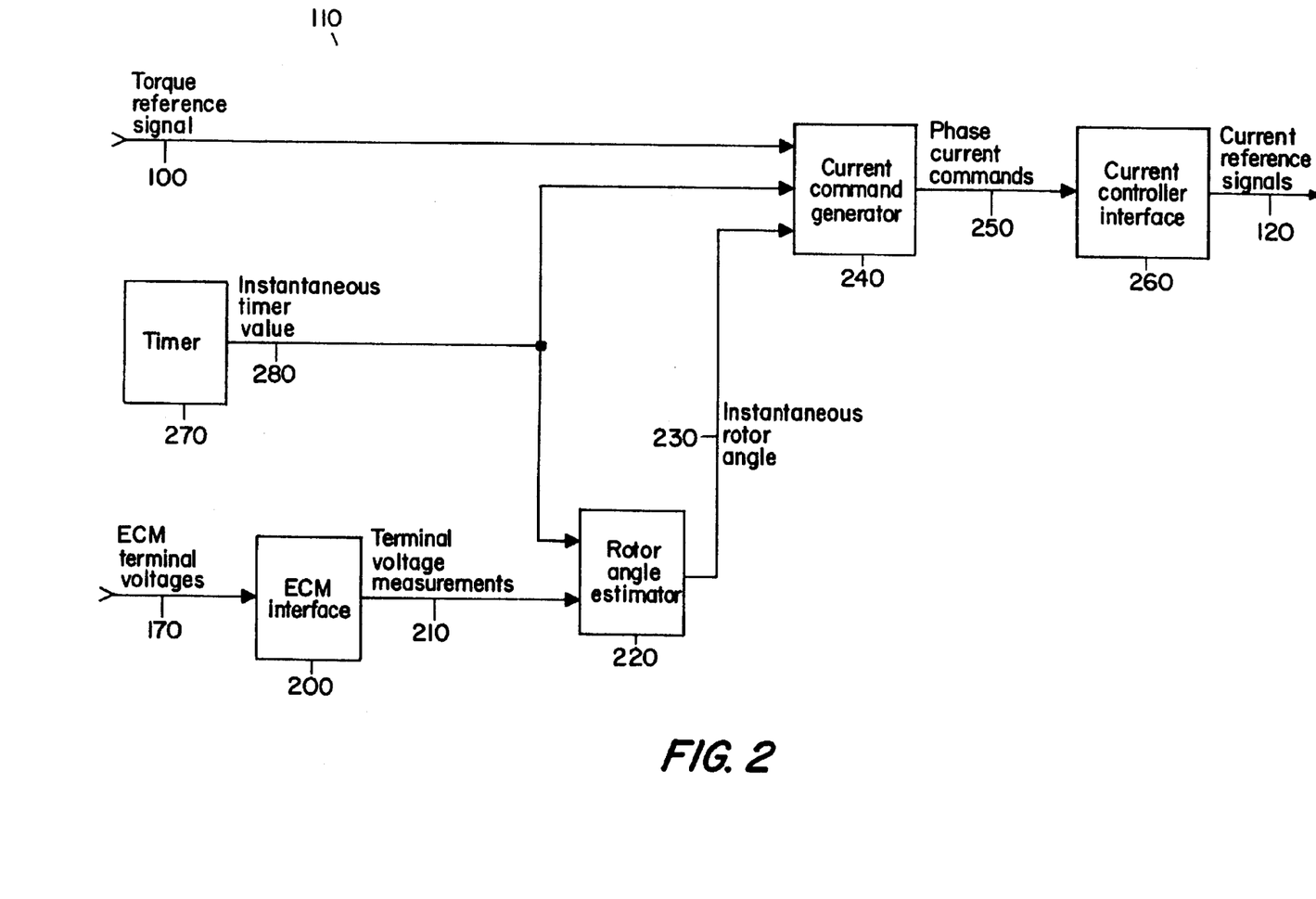
FIG. 2 is a block diagram of one example embodiment of a torque controller for use in the embodiment of FIG. 1.

In one embodiment of the invention, torque controller 110 (FIG. 2) comprises: an ECM interface 200, a timer 270, a rotor angle estimator 220, a current command generator 240, and a current controller interface 260. ECM interface 200 is coupled to the terminals of trapezoidal ECM 160 and provides a set of terminal voltage measurements 210 in a format compatible with rotor angle estimator 220. An instantaneous timer value 280 is maintained by timer 270 which serves as a real-time clock for the system. Rotor angle estimator 220 uses a back EMF threshold crossing sensing technique to compute an instantaneous rotor angle 230 from terminal voltage measurements 210 and from instantaneous timer value 280; in some embodiments of the invention, instantaneous rotor angle 230 is the angle directly corresponding to a back EMF threshold crossing event; in other embodiments, instantaneous rotor angle 230 is extrapolated from past back EMF threshold crossing events to provide finer angular resolution. Current command generator 240 computes a set of phase current commands 250 from instantaneous rotor angle 230 and torque reference signal 100. Each of the phase current commands 250 comprises at least one ripple compensation command segment 1297, 1298, 1299 (FIG. 12) and at least one zero current command segment 1230, 1231, 1232. Current controller interface 260 converts the phase current commands 250 to the set of current reference signals 120 in a format compatible with current controller 130.

Figure 12:
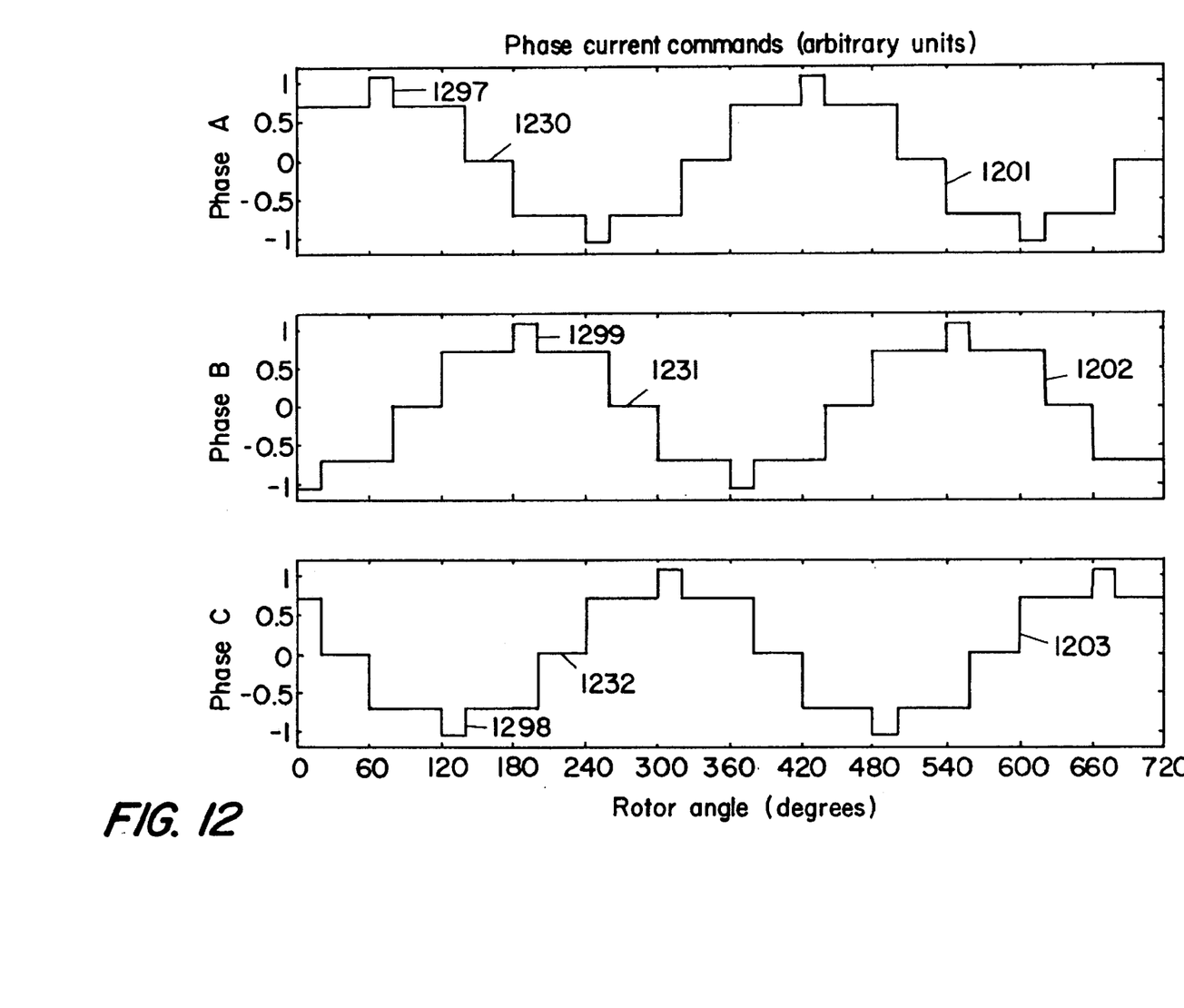
FIG. 12 is a set of graphs illustrating a set of phase current commands, each of the phase current commands comprising at least one ripple compensation command segment and at least one zero current command segment, which, when applied to a current controller, produce modified current waveforms approximating those of FIG. 9.

In some embodiments of the invention, phase current commands 250 are also a function of instantaneous timer value 280. For example, in variable speed applications, while the leading edge of the ripple compensation command segment 1297, 1298, 1299 is initiated at a specified instantaneous rotor angle 230, it is sometimes desirable for the ripple compensation command segment 1297, 1298, 1299 to have a calculated time duration rather than a pre-specified angular duration. In such embodiments, the trailing edge of the ripple compensation command segment 1297, 1298, 1299 is initiated at a calculated instantaneous timer value 280. Input quantities to the calculated time duration computation may comprise, but are not limited to, torque reference signal 100, the maximum available ECM terminal voltage 170, and the electrical impedance of the phase windings of trapezoidal ECM 160.

Figure 3:
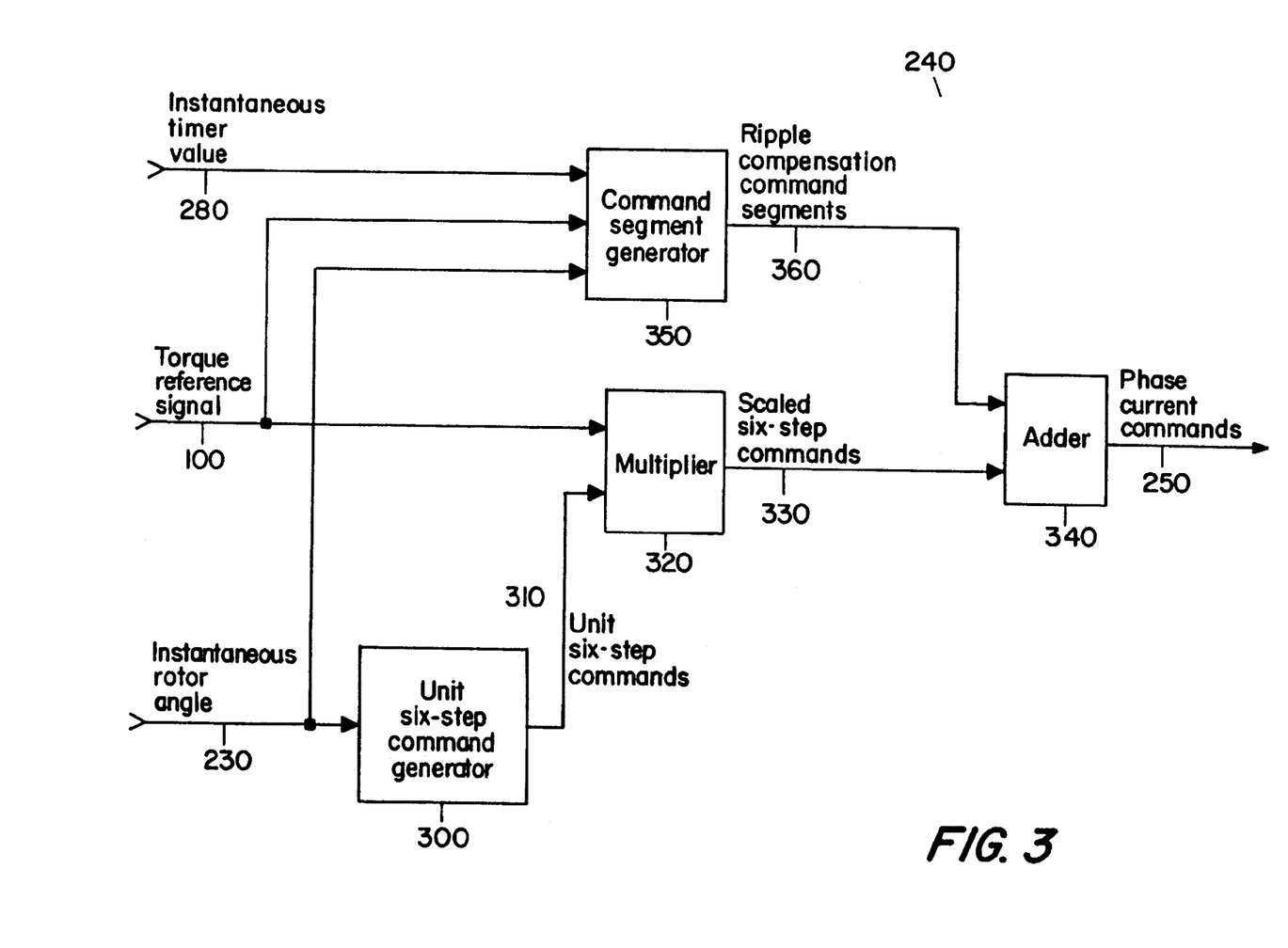
FIG. 3 is a block diagram of one example embodiment of a current command generator for use in the embodiment of FIG. 1.

In a more specific embodiment of the invention, current command generator 240 (FIG. 3) comprises: a unit six-step command generator 300, a multiplier 320, a command segment generator 350, and an adder 340. Unit six-step command generator 300 generates a set of unit six-step commands 310 from instantaneous rotor angle 230. By way of example, but not limitation, if torque reference signal 100 represents torque in newton-meters, then unit six-step commands 310 have the same shape as the six step commands 1101, 1102, 1103 (FIG. 11), only unit six-step commands 310 are scaled to produce a modified total motor torque 1004 (FIG. 10) of one newton-meter. Multiplying these unit six-step commands 310 by torque reference signal 100 yields a set of scaled six-step commands 330 capable of producing total motor torque 804 (FIG. 8) with constant segments at the desired torque level. Command segment generator 350 computes a set of ripple compensation command segments 360 from instantaneous rotor angle 230 and torque reference signal 100. As discussed above, in some embodiments of the invention, ripple compensation command segments 360 are also functions of instantaneous timer value 280. Adding respective ones of ripple compensation command segments 360 to scaled six-step commands 330 yields phase current commands 250 which deliver a modified total motor torque 1004 at the desired torque level.

Figure 4:
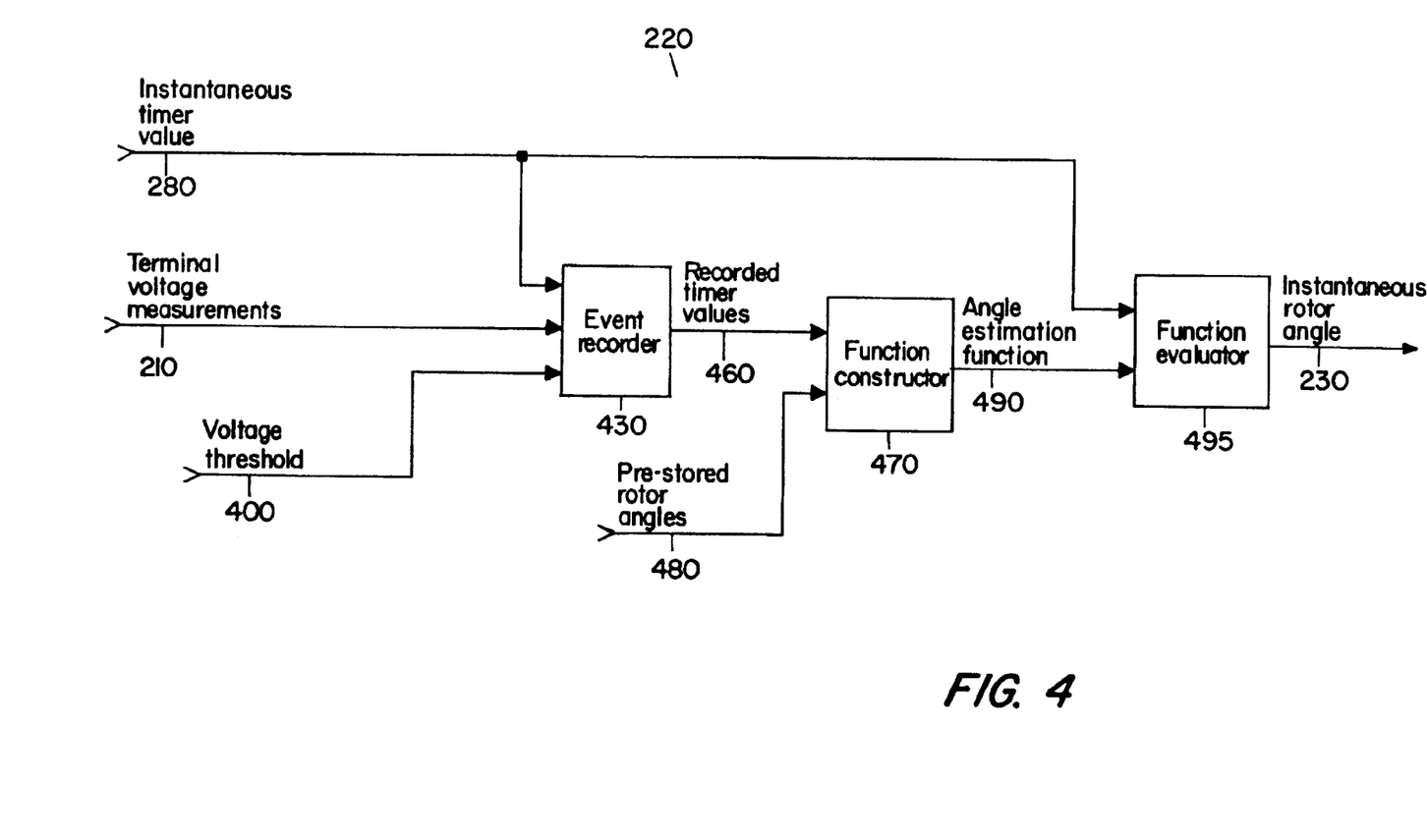
FIG. 4 is a block diagram of one example of a rotor angle estimator for use in the embodiment of FIG. 2.

In another embodiment of the invention, rotor angle estimator 220 (FIG. 4) comprises: an event recorder 430, a function constructor 470, and a function evaluator 495. An angle estimation function 490 is evaluated at instantaneous timer value 280 by function evaluator 495 to yield instantaneous rotor angle 230. Whenever any of terminal voltage measurements 210 crosses a voltage threshold 400, event recorder 430 includes instantaneous timer value 280 in a set of recorded timer values 460. Function constructor 470 then constructs a new angle estimation function 490 from the set of recorded timer values 460 and from a set of respective, pre-stored rotor angles 480.

Figure 5:
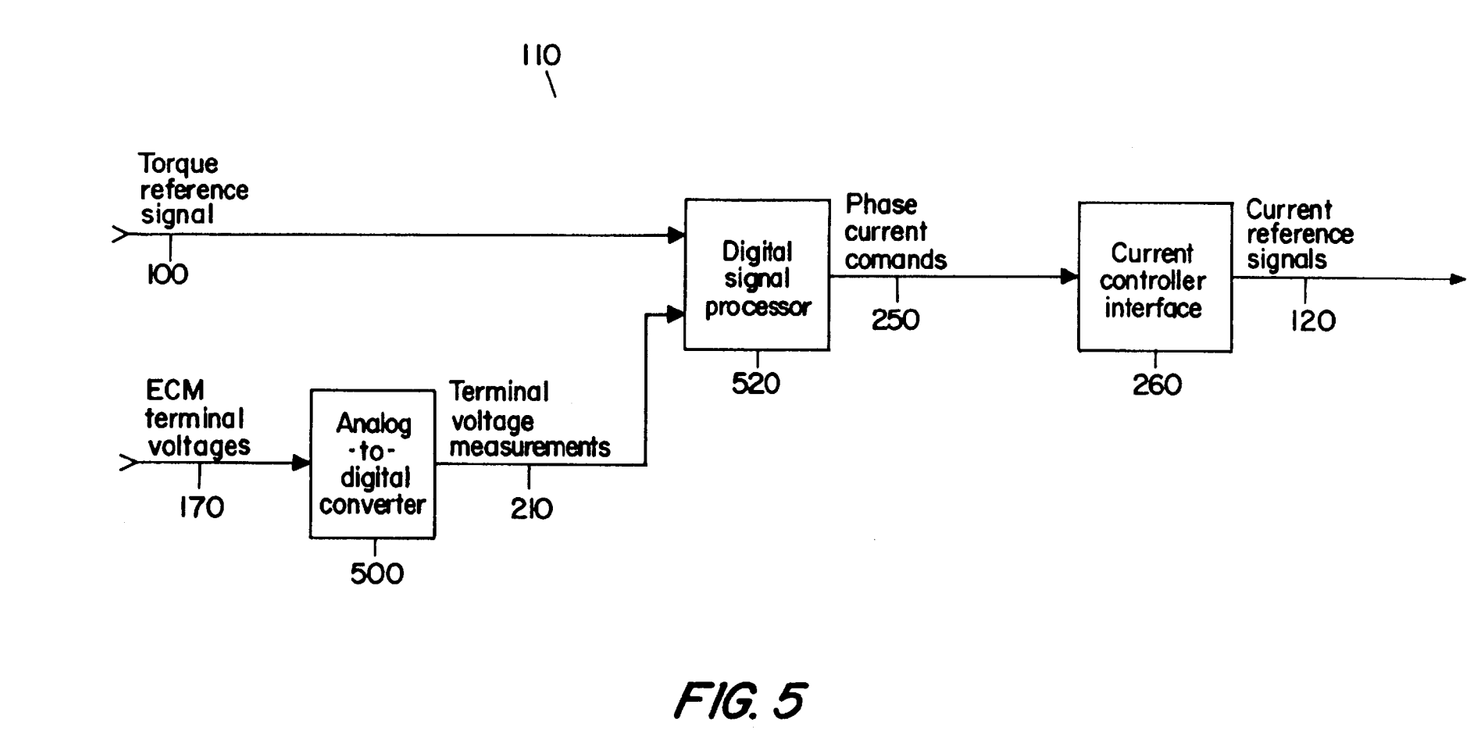
FIG. 5 is a block diagram of another example of a torque controller for use in the embodiment of FIG. 1.

In another embodiment of the invention, torque controller 110 (FIG. 5) comprises: an analog-to-digital converter 500, a current controller interface 260, and a digital signal processor 520. Analog-to-digital converter 500 serves as an ECM interface 200 and provides a set of terminal voltage measurements 210 in a format compatible with digital signal processor 520. Current controller interface 260 converts a set of phase current commands 250, generated by digital signal processor 520, into a set of current reference signals 120 compatible with current controller 130. Digital signal processor 520 implements rotor angle estimator 220 and current command generator 240 in software. As defined herein, the term "digital signal processor" includes, but is not limited to, single-chip digital signal processors (i.e., DSP chips), microprocessors, microcontrollers, bit-slice processors, and application specific integrated circuits (ASICs).

Figure 6:
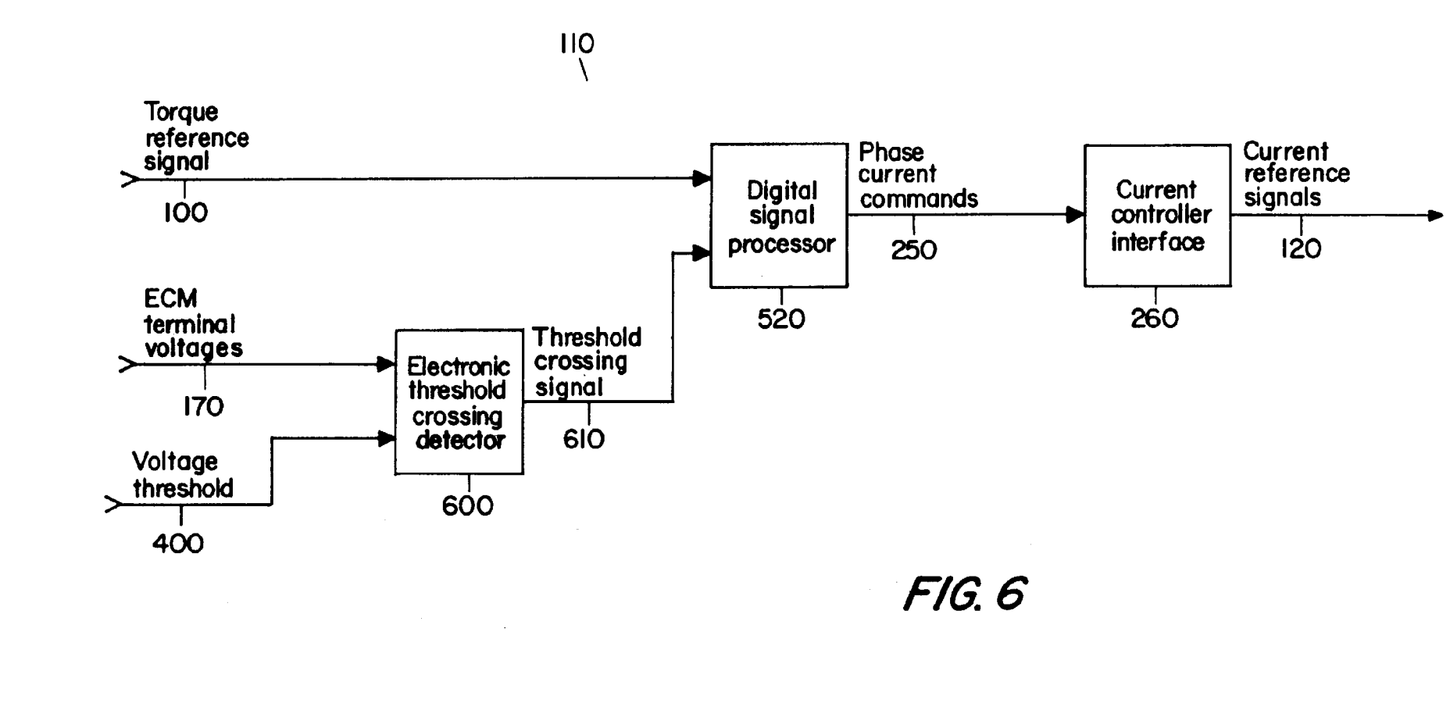
FIG. 6 is a block diagram of another example of a torque controller for use in the embodiment of FIG. 1.

In still another embodiment of the invention (FIG. 6), analog-to-digital converter 500 is replaced by an electronic threshold crossing detector 600. Electronic threshold crossing detector 600 generates a threshold crossing signal 610 whenever ECM terminal voltages 170 cross a voltage threshold 400. Thus, the threshold detection function of event recorder 430 is implemented in hardware. Digital signal processor 520 responds to threshold crossing signal 610 by including instantaneous timer value 280 in a set of recorded timer values 460 (FIG. 4) and otherwise completing the functions of rotor angle estimator 220 and current command generator 240.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for shaping current in an electronically commutated motor (ECM) comprising:

acquiring a set of terminal voltage measurements;

estimating an instantaneous rotor angle from said terminal voltage measurements;

generating a set of phase current commands from said instantaneous rotor angle and from a torque reference signal, each of said phase current commands comprising at least one ripple compensation command segment and at least one zero current command segment; and converting said set of phase current commands to a set of current reference signals.

2. The method of claim 1 wherein estimating said instantaneous rotor angle comprises:

maintaining a timer having an instantaneous timer value;

evaluating said angle estimation function at said instantaneous timer value to yield said instantaneous rotor angle;

including said instantaneous timer value in a set of recorded timer values whenever any of said terminal voltage measurements crosses a voltage threshold; and constructing an angle estimation function from said set of recorded timer values and from a set of respective, pre-stored rotor angles.

3. The method of claim 1 wherein generating said set of phase current commands from said instantaneous rotor angle and from said torque reference signal comprises:

generating a set of unit six-step commands from said instantaneous rotor angle;

multiplying said set of unit six-step commands by said torque reference signal to yield a set of scaled six-step commands;

computing a set of ripple compensation command segments from said instantaneous rotor angle and said torque reference signal; and adding said scaled six-step commands to respective ones of said ripple compensation command segments to yield said phase current commands.

4. The method of claim 3 further comprising maintaining a timer having an instantaneous timer value and wherein said set of ripple compensation command segments are also functions of said instantaneous timer value.

5. An apparatus for shaping current in an electronically commutated motor (ECM) comprising:

an ECM interface adapted to acquire a set of terminal voltage measurements;

a rotor angle estimator adapted to compute an instantaneous rotor angle from said terminal voltage measurements;

a current command generator adapted to compute a set of phase current commands from said instantaneous rotor angle and from a torque reference signal, each of said phase current commands comprising at least one ripple compensation command segment and at least one zero current command segment; and a current controller interface adapted to convert said set of phase current commands to a set of current reference signals.

6. The apparatus of claim 5 wherein said rotor angle estimator comprises:

a timer adapted to maintain an instantaneous timer value;

a function evaluator adapted to evaluate an angle estimation function at said instantaneous timer value to yield said instantaneous rotor angle;

an event recorder adapted to include said instantaneous timer value in a set of recorded timer values whenever any of said terminal voltage measurements crosses a voltage threshold; and a function constructor adapted to construct said angle estimation function from said set of recorded timer values and from a set of respective, pre-stored rotor angles.

7. The apparatus of claim 5 wherein said current command generator further comprises:

a unit six-step command generator adapted to generate a set of unit six-step commands from said instantaneous rotor angle;

a multiplier adapted to multiply said set of unit six-step commands by said torque reference signal to yield a set of scaled six-step commands;

a command segment generator adapted to compute a set of ripple compensation command segments from said instantaneous rotor angle and said torque reference signal; and an adder adapted to add said scaled six-step commands to respective ones of said ripple compensation command segments to yield said phase current commands.

8. The apparat us of claim 7 further comprising a timer adapted to maintain an instantaneous timer value and wherein said command segment generator is further adapted to receive said instantaneous timer value.

9. An apparatus for shaping current in an electronically commutated motor (ECM) comprising:

an analog-to-digital converter adapted to acquire a set of terminal voltage measurements;

a current controller interface adapted to convert a set of phase current commands to a set of current reference signals; and a digital signal processor adapted to implement an algorithm comprising:

estimating an instantaneous rotor angle from said terminal voltage measurements; and generating said set of phase current commands from said instantaneous rotor angle and from a torque reference signal, each of said phase current commands comprising at least one ripple compensation command segment and at least one zero current command segment.

10. The apparatus of claim 9 wherein estimating said instantaneous rotor angle comprises:

maintaining a timer having an instantaneous timer value;

evaluating an angle estimation function at said instantaneous timer value to yield said instantaneous rotor angle;

including said instantaneous timer value in a set of recorded timer values whenever any of said terminal voltage measurements crosses a voltage threshold; and constructing said angle estimation function from said set of recorded timer values and from a set of respective, pre-stored rotor angles.

11. The apparatus of claim 9 wherein generating said set of phase current commands from said instantaneous rotor angle and from a torque reference signal comprises:

generating a set of unit six-step commands from said instantaneous rotor angle;

multiplying said set of unit six-step commands by said torque reference signal to yield a set of scaled six-step commands;

computing a set of ripple compensation command segments from said instantaneous rotor angle and said torque reference signal; and adding said scaled six-step commands to respective ones of said ripple compensation command segments to yield said phase current commands.

12. The apparatus of claim 11 wherein generating said set of phase current commands further comprises maintaining a timer having an instantaneous timer value and wherein said set of ripple compensation command segments are also functions of said instantaneous timer value.

13. A method for shaping current in an electronically commutated motor (ECM) comprising:

acquiring a set of terminal voltage measurements;

maintaining a timer having an instantaneous timer value;

evaluating an angle estimation function at said instantaneous timer value to yield an instantaneous rotor angle;

including said instantaneous timer value in a set of recorded timer values whenever any of said terminal voltage measurements crosses a voltage threshold;

constructing said angle estimation function from said set of recorded timer values and from a set of respective, pre-stored rotor angles;

generating a set of unit six-step commands from said instantaneous rotor angle;

multiplying said set of unit six-step commands by said torque reference signal to yield a set of scaled six-step commands;

computing a set of ripple compensation command segments from said instantaneous rotor angle, said torque reference signal, and said instantaneous timer value;

adding said scaled six-step commands to respective ones of said ripple compensation command segments to yield said phase current commands; and converting said set of phase current commands to a set of current reference signals.

14. An apparatus for shaping current in an electronically commutated motor (ECM) comprising:

an analog-to-digital converter adapted to acquire a set of terminal voltage measurements;

a current controller interface adapted to convert a set of phase current commands to a set of current reference signals; and a digital signal processor adapted to implement an algorithm comprising:

maintaining a timer having an instantaneous timer value;

evaluating an angle estimation function at said instantaneous timer value to yield an instantaneous rotor angle;

including said instantaneous timer value in a set of recorded timer values whenever any of said terminal voltage measurements crosses a voltage threshold;

constructing said angle estimation function from said set of recorded timer values and from a set of respective, pre-stored rotor angles;

generating a set of unit six-step commands from said instantaneous rotor angle;

multiplying said set of unit six-step commands by said torque reference signal to yield a set of scaled six-step commands;

computing a set of ripple compensation command segments from said instantaneous rotor angle, said torque reference signal, and said instantaneous timer value; and adding said scaled six-step commands to respective ones of said ripple compensation command segments to yield said phase current commands.

15. An apparatus for shaping current in an electronically commutated motor (ECM) comprising:

an electronic threshold crossing detector adapted to generate a threshold crossing signal whenever any ECM terminal voltage crosses a voltage threshold;

a current controller interface adapted to convert a set of phase current commands to a set of current reference signals; and a digital signal processor adapted to implement an algorithm comprising:

maintaining a timer having an instantaneous timer value;

evaluating an angle estimation function at said instantaneous timer value to yield an instantaneous rotor angle;

including said instantaneous timer value in a set of recorded timer values in response to said threshold crossing signal;

constructing said angle estimation function from said set of recorded timer values and from a set of respective, pre-stored rotor angles;

generating a set of unit six-step commands from said instantaneous rotor angle;

multiplying said set of unit six-step commands by said torque reference signal to yield a set of scaled six-step commands;

computing a set of ripple compensation command segments from said instantaneous rotor angle, said torque reference signal, and said instantaneous timer value; and adding said scaled six-step commands to respective ones of said ripple compensation command segments to yield said phase current commands.

* * * * *